March 15, 1949.  H. B. FUGE  2,464,745
ELECTRIC SERVOMOTOR CONTROL SYSTEM
Filed July 13, 1945

Inventor
Harry B. Fuge
By William P. Stewart
Attorney

Patented Mar. 15, 1949

2,464,745

UNITED STATES PATENT OFFICE 2,464,745

ELECTRIC SERVOMOTOR CONTROL SYSTEM

Harry B. Fuge, Somerville, N. J., assignor to The Singer Manufacturing Company, Elizabeth, N. J., a corporation of New Jersey Application July 13, 1945, Serial No. 604,959

1 Claim. (Cl. 318—207)

This invention relates to improved means for operating electric servomotors and more particularly to means for controlling motors of the three-phase low-inertia type so that they may be readily reversed.

Single-phase motors having main and control phase windings are used extensively for servo control systems due to the simplicity of the auxiliary equipment required. It is well-known that single-phase motors suffer in comparison with polyphase motors because of the non-uniform torque and larger weights per unit output of the former. On the other hand, the polyphase motor is more difficult to wind and to control than the single-phase motor because of the several phase axes.

It is an object of this invention to provide a reversible control system for a motor having the torque and weight advantages of the polyphase motor and the circuit control advantage of the single-phase motor.

It is a further object of this invention to provide an improved means for selectively reversing the effective phase rotation of a rotating magnetic field supplied from a three-phase source of electrical energy.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

Figure 1:
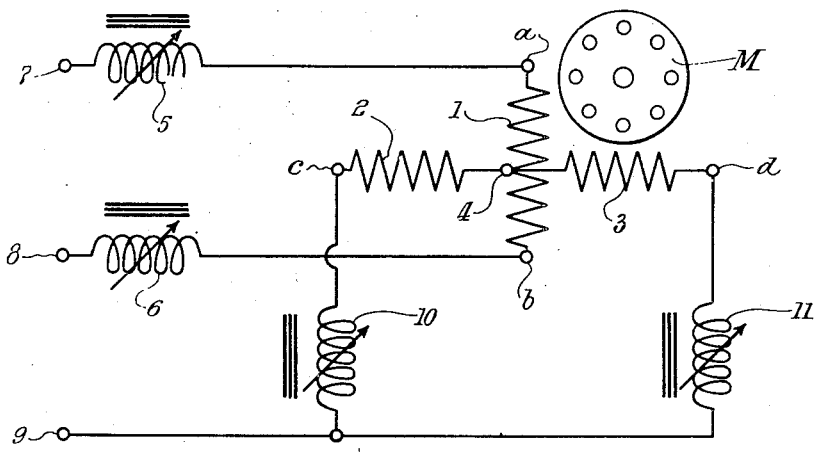
Fig. 1 is a diagrammatic illustration of a motor control system embodying the invention.

More specifically, Fig. 1 shows an induction motor M having a main stator winding 1 wound on one phase axis, and control windings 2 and 3 wound on a second phase axis spaced 90 electrical degrees from said first phase axis. Winding 2 is identical with winding 3 and both windings have a common junction at their proximate ends and at 4 which is the midpoint of winding 1. The sense of the winding is such that the terminals c and d of windings 2 and 3 respectively are 180 electrical degrees apart in space phase. The number of turns in each one of the control windings, 2 and 3, is substantially 86.6% of the number of turns in the main winding 1 in accordance with the well-known ratio for Scott-connected windings.

The main winding 1 is connected through variable reactance devices 5 and 6 to terminals 7 and 8 respectively of one phase of a source of three-phase electrical energy. Control windings 2 and 3 are connected at their free ends to the remaining terminal 9 of the source through variable reactance devices 10 and 11 respectively.

Figure 2:
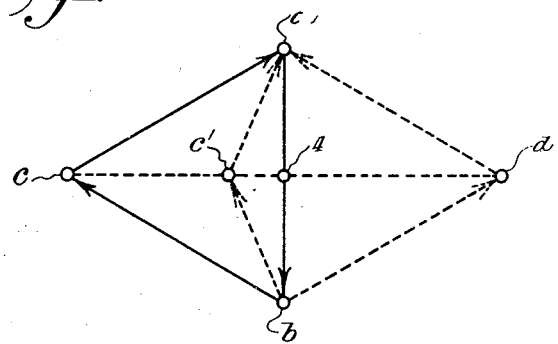
Fig. 2 is a vector diagram showing the manner in which a vector voltage triangle may be modified by translating the apex of one angle symmetrically to the other side of a base vector to reverse the phase rotation in accordance with the invention as embodied by the circuit of Fig. 1.

Let the variable reactance devices 5 and 6 be adjusted to their minimum reactance value. That is to say, the main winding 1 is effectively connected directly to the terminals 7 and 8. Further, let the variable reactance device 10 be adjusted for its minimum reactance and device 11 be adjusted for its maximum reactance. Under these conditions the vector diagram $a$—$b$—$c$, indicated by the full lines in Fig. 2, is obtained and indicates the voltage condition at the respective terminals, $a$, $b$ and $c$ of Fig. 1. It is seen that these vectors form a balanced three-phase system of clockwise phase rotation. Translated to the motor windings, a rotating field is produced and the rotor follows this field and rotates clockwise with it. This is normal operation for the ordinary polyphase induction motor.

Next, let the reactance value of reactance device 11 become a minimum and that of device 10 become a maximum. Under these conditions, the vector diagram $a$—$b$—$d$ of Fig. 2 indicates the voltages at the respective terminals in Fig. 1. It will be seen that the vector triangle has in effect been swung around the base vector $a$—$b$ and has the apex $c$ moved to $d$. This results in a reversal of the phase rotation (the vectors now point counter-clockwise) and the motor will rotate counter-clockwise.

These two conditions represent the extremes in reactance unbalance and it is possible to go from the one condition to the other continuously by changing the reactances 10 and 11 equally and oppositely. For example, as the reactance of 10 increases and of 11 decreases, the end of the effective voltage vector in the control winding axis traverses the line $c$—$d$ from $c$ toward $d$, its origin remaining at point 4. An intermediate point is given by the vector diagram $a$—$b$—$c'$. This is still clockwise phase rotation but represents a poorer (unbalanced) rotating field and hence corresponds to a slowing down of the motor rotor as compared with the conditions existing for the balanced vector diagram $a$—$b$—$c$. It is seen that further reactance unbalance will bring $c'$ to the point 4 and there will be no vector triangle and hence no torque and the motor will come to rest. At this point the control windings 2 and 3 are equally energized but, since they are mutually opposed, they cancel each other out as far as flux is concerned. Any further unbalance in the reactances will now increase the counter-clockwise vector diagram until the reversed but balanced diagram a—b—d is obtained.

Thus, by controlling the relative values of the reactance of devices 10 and 11, it is possible, without opening any circuits, to control the direction and speed of the motor.

As an example of a practical form of control for the variable reactance devices 10 and 11, reference may be had to the U. S. Patent No. 1,844,704, wherein are shown saturable reactors controlled by grid-controlled discharge devices for varying reactance values to effect reversal of a motor. Only two such reactors will be necessary in the present circuit.

It will be seen that, under the conditions set forth above, the main winding 1 is connected to the line 7–8 at all times. This is sometimes essential for quick response but, when such is not the case, much unnecessary heating may be avoided by removing or decreasing the excitation to the main winding 1 when the motor is standing still. The variable reactance devices 5 and 6 are provided for this purpose and may be adjusted to simultaneously have their maximum reactance values when the motor is standing still. It is evident that, when desired, but one of the devices 5, 6 may be used to decrease the main winding excitation.

While reactance devices have been shown and are preferred, it is well within the scope of this invention to use switch means to control the current flow.

It will be obvious to those skilled in the art that the invention may, without departure from its essential attributes, be embodied in various specific forms other than those shown and described, which latter are to be considered in all respects as illustrative of the invention and not restrictive, reference being had to the appended claims rather than to the foregoing description to indicate the scope of the invention.

Having thus set forth the nature of the invention, what I claim herein is:

A system for selectively reversing a rotating magnetic field comprising, in combination, a source of three-phase alternating current, a main winding connected to one phase of said source, a second winding having an axis spaced 90 electrical degrees from the axis of said main winding, a third winding having an axis spaced 270 electrical degrees from the axis of said main winding, said second and third windings being each connected at one end directly to a midpoint of said main winding and each having substantially 86% of the turns of said main winding, individual variable reactance means connecting the free end of each of said second and third windings to the terminal common to the other two phases of said source, and means for relatively varying said reactance means to control the division of current from said source between said second and third windings.

HARRY B. FUGE.

REFERENCES CITED

The following references are of record in the file of this patent:

UNITED STATES PATENTS

| Number | Name | Date |
| --- | --- | --- |
| 1,787,133 | Wilson | Dec. 30, 1930 |
| 1,844,704 | Thompson | Feb. 9, 1932 |
| 2,228,078 | Gulliksen | Jan. 7, 1941 |
| 2,260,122 | Moore | Oct. 21, 1941 |
| 2,390,463 | Roters | Dec. 4, 1945 |
| 2,399,872 | Krussmann | May 7, 1946 |
| 2,440,319 | Wickerham | Apr. 27, 1948 |

FOREIGN PATENTS

| Number | Country | Date |
| --- | --- | --- |
| 110,359 | Great Britain | Nov. 27, 1917 |